United States Patent [19]

Kurokawa

[11] Patent Number: 4,864,606
[45] Date of Patent: Sep. 5, 1989

[54] TERMINAL APPARATUS WITH A HANDSET USING A FOUR PIN CONNECTOR

[75] Inventor: Shunji Kurokawa, Ebina, Japan
[73] Assignee: Ricoh Company, Ltd., Tokyo, Japan
[21] Appl. No.: 133,376
[22] Filed: Dec. 15, 1987
[30] Foreign Application Priority Data Dec. 15, 1986 [JP] Japan .................... 61-193195[U]

[51] Int. Cl.⁴ .................................................. H04M 1/00
[52] U.S. Cl. ........................................ 379/387; 379/377
[58] Field of Search ............... 379/433, 442, 100, 391, 379/377, 368, 387, 388, 413

[56] References Cited

U.S. PATENT DOCUMENTS 3,627,930 12/1971 Tolman .......................... 379/433
4,400,589 8/1983 Synek ............................ 379/391
4,523,056 6/1985 Fisher ............................ 379/368

Primary Examiner—Jin F. Ng
Assistant Examiner—Bonita Lewis
Attorney, Agent, or Firm—Oblon, Spivak, McClelland, Maier & Neustadt

[57] ABSTRACT

A communication terminal apparatus having a handset which includes a transmitter, a receiver and a hook switch. The handset is connected to the main body through a modular jack having four pins. The handset includes a bypass circuit for flowing a d.c. component therethrough by bypassing the transmitter or receiver and a capacitor, which is connected in parallel with the bypass circuit and in series with the transmitter or receiver, for cutting a d.c. component. Thus, the status information of the hook switch is applied to a signal line of the transmitter or receiver in a d.c. format superimposingly.

6 Claims, 5 Drawing Sheets

TERMINAL APPARATUS WITH A HANDSET USING A FOUR PIN CONNECTOR

BACKGROUND OF THE INVENTION

1. Field of the Invention

This invention generally relates to a terminal apparatus having a handset, and, in particular, to a terminal apparatus having a handset which includes a transmitter, a receiver and a hook switch and which may be connected to a main body of the terminal apparatus through a 4-pin modular jack.

2. Description of the Prior Art

Various kinds of communication terminal apparatuses for carrying out transmission and reception of data using a telephone network as a transmission line are currently in use, and such communication terminal apparatuses include facsimile machines, personal computers, and word processors. In such communication terminal apparatuses, in general, in order to obtain a reduction in the total cost, it is often so structured that a communication circuit of a telephone is provided in the main body of a terminal apparatus and a handset provided with a transmitter and a receiver is connected to the terminal apparatus main body through a modular jack.

A hook switch is typically provided in a telephone function, and when this hook switch is provided in the terminal apparatus main body, use is made of a 4-pin modular jack for transmitter and receiver as shown in FIG. 5 for a connection between the terminal apparatus main body and a handset. However, when a hook switch is provided in a handset, use is made of a 6-pin modular jack. FIG. 6 illustrates a connection example between the terminal apparatus main body and the handset in such a case. As shown, there is provided a receiver amplifier 1 in the terminal apparatus main body and an audio signal is input into the receiver amplifier 1 from a communication circuit which is not shown. The receiver amplifier 1 amplifies the thus input audio signal to a predetermined level and outputs the audio signal to a receiver 2 through a first pin indicated by circled 1 of a modular jack. A transmitter 3 is provided in a handset and it converts an audio signal into an electrical signal and outputs the audio signal to a transmitter amplifier 4 through a third pin indicated by circled 3 of the modular jack. The transmitter amplifier 4 amplifies the thus input audio signal to a predetermined level and outputs the amplified signal to the before-mentioned communication circuit.

Also provided is a hook switch 5 which is set open when the handset is placed in a predetermined position, such as a handset rest, i.e., during on-hook, and it is closed when the handset is lifted from the handset rest, i.e., during off-hook. An input to a buffer 6 pulled up through a resistor R is connected to the hook switch 5 through a fifth pin indicated by circled 5 of the modular jack, so that when the hook switch 5 is set open, the buffer 6 supplies an output at high level, whereas, when the hook switch 5 is closed, the buffer 6 supplies an output at low level. The buffer 6 is typically of the Schmidt trigger type, and it detects the on/off condition of the hook switch 5 and supplies its output to the before-mentioned communication circuit.

However, in such a prior art communication terminal apparatus with a handset, if the hook switch is disposed in the handset, use is made of a 6-pin modular jack as described above, so that there are following disadvantages. That is, for a communication apparatus, it is often desired that variations be provided in model using the same type of main body frame and a handset is made as an optional part. In such a case, as shown in FIGS. 7a and 7b, a handset rest 9 is made as a separate element which can be attached to a side of a main body frame 10, and a handset 11 is placed on the handset rest 9 to thereby define a handset assembly 12. In such a case, it is preferable to provide the handset assembly 12 to be detachable, so that it can be removed from the main body frame 10 when it is not expected to be used for some time or during shipping. However, if the handset assembly 12 is provided to be detachable, the hook switch is required to be provided in the handset 12. However, in a terminal apparatus provided with a communication function using a telephone network, in particular a facsimile machine, a 6-pin modular jack 7 or connection to an actual telephone is typically provided, as shown in FIG. 7a. However, as shown in FIG. 7b, if a 6-pin modular jack 8 is also provided in the main body 10 for the handset, the same terminal apparatus comes to be provided with two modular jacks same in structure but different in interface. As a result, with such a structure, there is a chance that an erroneous connection is established.

Under the circumstances, in order to obviate the disadvantages as described above, it is conceivable to establish connection between a handset and a terminal apparatus main body with four signal lines as shown in FIG. 8. It is to be noted that those elements identical to those shown in FIG. 6 are indicated by identical numerals. According to this method, the three return lines (ground lines) within the handset are substituted by a single common line. However, with this structure, since the return lines of all of the receiver 2, transmitter 3 and hook switch 5 are commonly connected, it is not advantageous because noise may be transferred between the receiver 2 and the transmitter 3. In addition, with this structure, the transmitter 3 cannot be constructed in the balanced type because, in the balanced type, two signal lines of the transmitter 3 are required to float relative to ground.

SUMMARY OF THE INVENTION

In accordance with the present invention, there is provided a terminal apparatus with a handset which includes a transmitter, a receiver and a hook switch. The handset is connected to a terminal apparatus main body through a modular jack having a predetermined number of pins. A bypass circuit is provided in the handset for flowing a d.c. component by bypassing the transmitter or receiver. A capacitor for cutting a d.c. component is provided as connected in parallel with the bypass circuit and in series with the transmitter or receiver. In addition, a d.c. power supply is disposed in the terminal apparatus main body for supplying a d.c. component through one of the pins, to which the hook switch is connected. And, a detector for detecting the operation of the hook switch depending on a change in status of the d.c. component is provided. Also provided is an intergrating circuit for integrating a d.c. component input into the detector.

It is therefore a primary object of the present invention to obviate the disadvantages of the prior art as described above and to provide an improved terminal apparatus with a handset.

Another object of the present invention is to provide an improved terminal apparatus with a handset suitable for use in communication using a telephone network as a transmission line.

A still further object of the present invention is to provide an improved terminal apparatus with a handset using a 4-pin modular jack for establishing a connection between the handset and the terminal apparatus main body.

A still further object of the present invention is to provide an improved terminal apparatus with a handset in which signal lines of a transmitter and a receiver are operatively independent from each other.

A still further object of the present invention is to provide an improved terminal apparatus with a handset, capable of preventing the occurrence of erroneous connection.

Other objects, advantages and novel features of the present invention will become apparent from the following detailed description of the invention when considered in conjunction with the accompanying drawings.

BRIEF DESCRIPTION OF THE DRAWINGS

FIG. 7b is a side view showing the terminal apparatus shown in FIG. 7a; and

DESCRIPTION OF THE PREFERRED EMBODIMENTS

Figure 1:
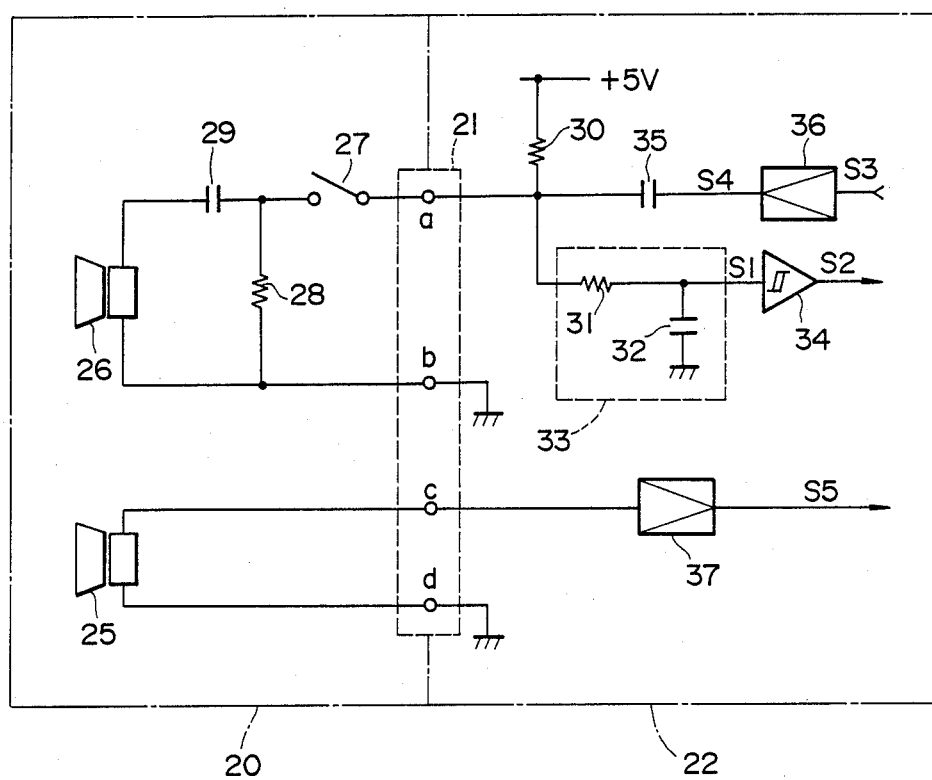
FIG. 1 is a circuit diagram showing the electrical structure of a terminal apparatus having a handset constructed in accordance with one embodiment of the present invention.
Figure 2:
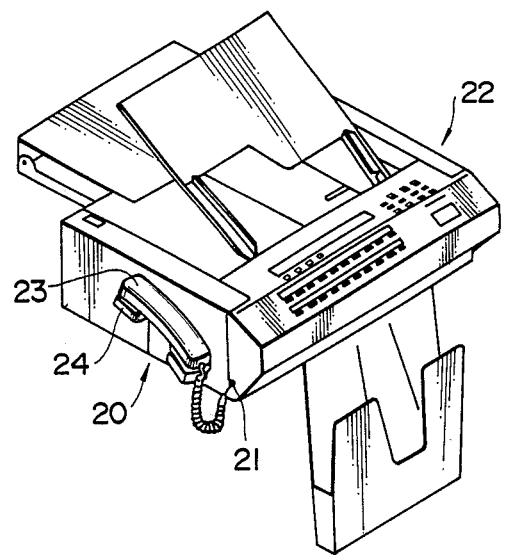
FIG. 2 is a perspective view showing the overall outlook of a facsimile machine having a handset incorporating the circuit structure shown in FIG. 1.
Figure 3:
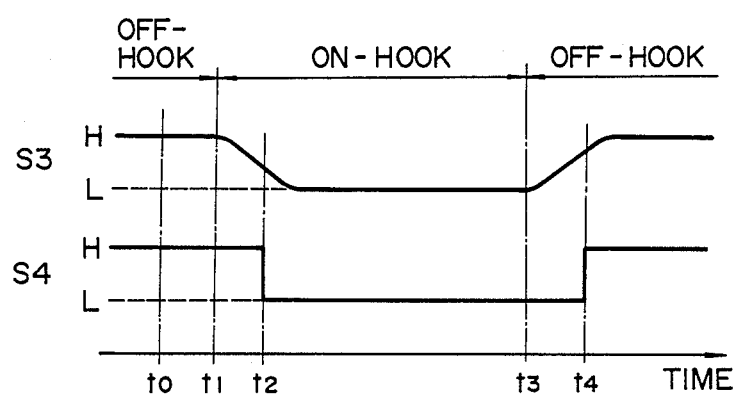
FIG. 3 is a timing chart which is useful for understanding the operation of the structure shown in FIG. 1.

Referring now to FIGS. 1 through 4, there is schematically shown in electrical circuit diagram format a facsimile machine including a handset assembly 20 and a main body 22 constructed in accordance with one embodiment of the present invention. As shown, the handset assembly 20 is electrically and operatively connected to the terminal apparatus main body 22 through a 4-pin modular jack 21 having four pins a through d. The terminal apparatus main body 22 may, for example, be comprised of a facsimile machine as shown in FIG. 2, and the handset assembly 20 preferably includes a handset 23 and a handset rest 24 and is detachably attached to the terminal apparatus main body 22 at its side.

The handset assembly 20 includes a transmitter 25, a receiver 26 and a hook switch 27, and the transmitter 25 has two signal lines which are connected to pins c and d of the modular jack 21. One end of the hook switch 27 is connected to pin of the modular jack 21 and the other end of the hook switch 27 is connected to one end of a resistor 28. The hook switch 27 is set open when the handset 23 is placed in position on the handset rest 24, i.e., during on-hook; on the other hand, the hook switch 27 is closed when the handset 23 is lifted above the handset rest 24, i.e., during off-hook. The hook switch 27 may be disposed either in the handset 23 or in the handset rest 24. The other end of the resistor 28 is connected to pin b of the modular jack 21. It is to be noted that the resistor 28 has a function as a bypass circuit for flowing a d.c. component therethrough. The resistance value of the resistor 28 is set in the order of ten times larger than the impedance of the receiver 26 so as not to increase the load of the receiver amplifier 36 because the resistor 28 serves as a load of the receiver amplifier 36. To the receiver 26 is connected in series a capacitor 29 for cutting a d.c. component, and the receiver 26 and the capacitor 29 are connected in parallel with the resistor 28.

On the other hand, the terminal apparatus main body 22 is provided with a d.c. power supply (not shown) and a supply voltage of +5 V is applied to pin a of the modular jack 21 through the resistor 30. The resistance value of the resistor 30 is set approximately at ten times of the resistance value of the resistor 28 so that the voltage at pin a of the modular jack 21 lowers sufficiently when the hook switch 27 is closed. In addition, to pin a of the modular jack 21 is connected an integrating circuit 33 which includes a resistor 31 and a capacitor 32. The integrating circuit 33 integrates the d.c. component at pin a to thereby output an integration signal $S_1$ to a buffer 34 serving as a detector. The time constant of the integrating circuit 33 is set to be sufficiently larger as compared with the minimum frequency of a later-described audio signal $S_4$ to be applied to pin a. The buffer 34 is the so-called Schmidt trigger type buffer and it receives the integration signal $S_1$ and outputs a detection signal $S_2$ to a communication circuit which is not shown. The terminal apparatus main body 22 receives the detection signal $S_2$ to thereby confirm the status of the hook switch, thereby carrying out a series of operations as a facsimile machine through a telephone network. In addition, an output terminal of a receiver amplifier 36 is connected to pin a of the modular jack 21 through a capacitor 35 for cutting a d.c. component, and the audio signal $S_3$ from the before-mentioned communication circuit is input into the receiver amplifier 36. Upon receipt of the audio signal $S_3$ the receiver amplifier 36 amplifies it to a predetermined level and then outputs an audio signal $S_4$ to pin a of the modular jack 21 through a capacitor 35.

Pins b and d of the modular jack 21 are connected to predetermined ground terminals provided in the terminal apparatus main body 22, and pin c of the modular jack 21 is connected to an input terminal of the transmitter amplifier 37. The transmitter amplifier 37 receives a signal from the transmitter 25 through the modular jack 21, thereby causing the signal to be amplified to a predetermined level, and outputs an audio signal $S_5$ to the before-mentioned communication circuit.

In operation, suppose that the terminal apparatus is in an on-hook status, i.e., the hook switch 27 being open, the voltage at pin a of the modular jack 21 is approximately set at +5 V through the resistor 30. In addition, the capacitor 32 is charged approximately at +5 V through the resistors 30 and 31, and, thus, the integration signal $S_1$ is at high level. Thus, in response to this integration signal $S_1$, the detection signal $S_2$ output from the buffer 34 is at high level. In addition, a d.c. component of the voltage at pin a is cut by the capacitor 35, so that the operation of the receiver amplifier 36 is not affected. This condition takes place, for example, at time $t_0$ in the timing chart shown in FIG. 3.

Now, let us assume that an off-hook status is established at time $t_1$. Then, the hook switch 27 is closed and the voltage at pin a abruptly drops to a voltage (approximately 0.5 V) which is determined by a ratio between resistors 28 and 30. At this time, since the d.c. component at pin a is cut by the capacitor 29, the operation of the receiver 26 is not affected. Then, responsive to a change in voltage at pin a, the charge stored at the capacitor 32 is gradually discharged through the resistors 31 and 28, and the voltage level of the integration signal $S_1$ gradually reach low level. At time $t_2$, the voltage level of the integration signal $S_1$ reaches the threshold level of the buffer 34, so that the output of the buffer 34, i.e., detection signal $S_2$, becomes low level. And, due to this change of this detection signal $S_2$ from high level to low level, the terminal apparatus main body 22 confirms the off-hook status and then carries out a series of operations.

At this time, the audio signal $S_3$ is amplified by the receiver amplifier 36 and converted into the audio signal $S_4$ which is applied to the receiver 26 through the capacitor 35, modular jack 21, hook switch 27 and capacitor 29. In this manner, when the hook switch 27 changes from the open status to the closed status at time $t_1$, there is a time delay ($t_1-t_2$) until the detection signal $S_2$ changes. That is, even if the audio signal $S_4$ is present at pin a, since the time constant of the integrating circuit 33 is set at a value which is sufficiently larger than the minimum frequency of the audio signal $S_4$, there is no chance that the audio signal $S_4$ enters the buffer 34. In other words, the buffer 34 is prevented from operating erroneously by the audio signal $S_4$. Furthermore, when the hook switch 27 is set open, i.e., on-hook status, at time $t_3$, the voltage at pin a is again set at +5 V. At this time, the capacitor 32 of the integrating circuit 33 is gradually charged through the resistors 30 and 31, and, thus, the integration signal $S_1$ gradually reaches high level.

At time $t_4$, when the voltage level of the integration signal $S_1$ reaches the threshold level of the buffer 34, the detection signal $S_2$ becomes high level. In this manner, when the hook switch 27 changes from the closed status to the open status at time $t_3$, there is produced a time delay ($t_3-t_4$) until the detection signal $S_2$ changes. In addition, since the hook switch 27 is set open, the receiver 26 is disconnected from the terminal apparatus main body 22. That is, while the handset assembly 20 is not in use, there is o chance that noise from the receiver 26 is introduced into the terminal apparatus main body 22.

Figure 4:
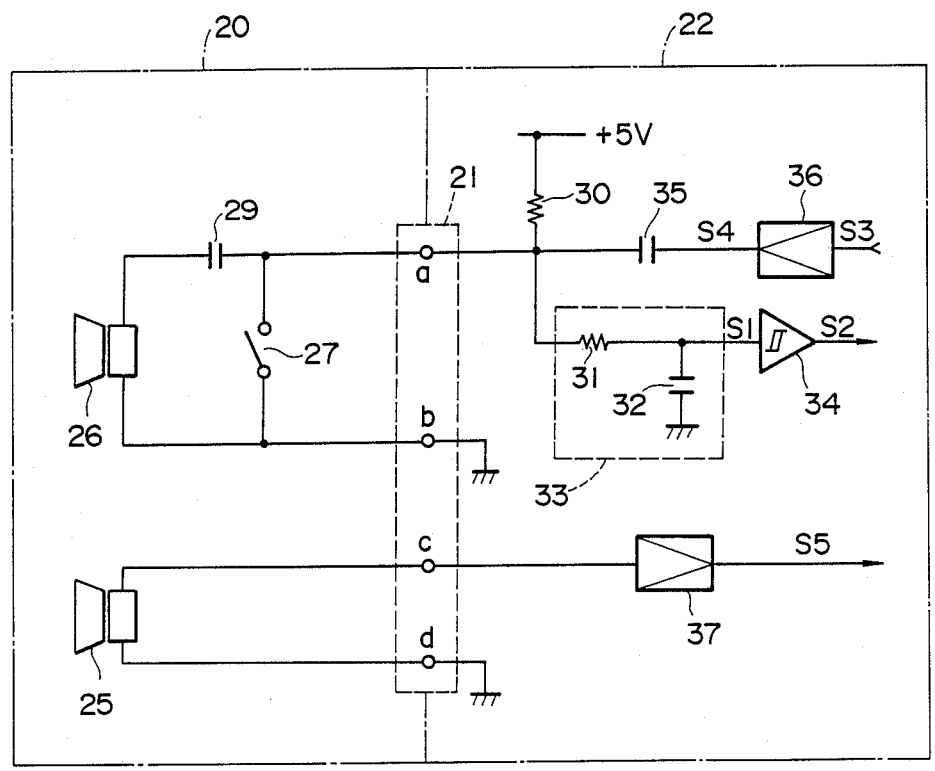
FIG. 4 is a circuit diagram showing the electrical structure of a terminal apparatus having a handset constructed in accordance with another embodiment of the present invention.
Figure 5:
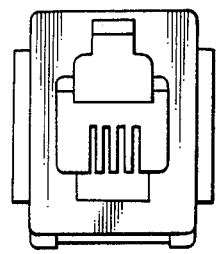
FIG. 5 is a front view showing a 4-pin modular jack which is typically used in a prior art terminal apparatus having a handset.
Figure 6:
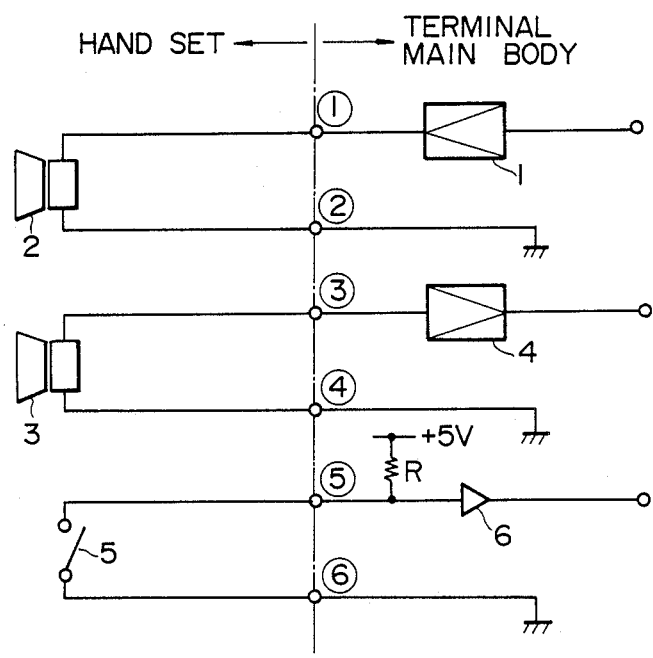
FIG. 6 is a circuit diagram showing one example of the prior art structure in which a connection between the terminal apparatus main body and the handset is established by six signal lines.
Figure 7A:
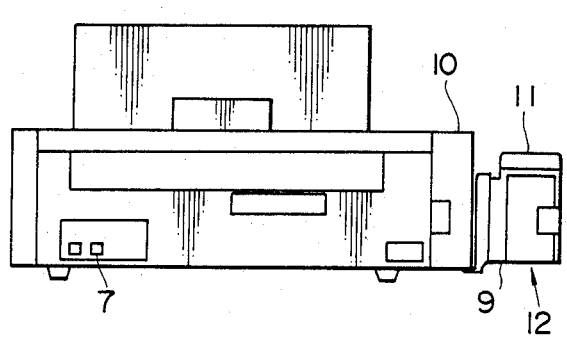
FIG. 7a is a rear view showing a prior art terminal apparatus having a handset.
Figure 7B:
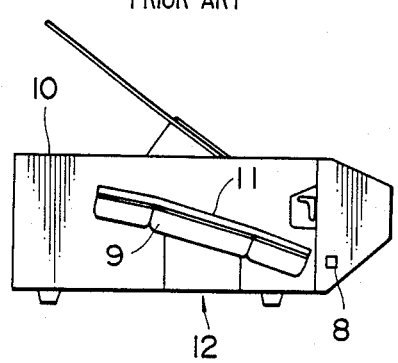
Figure 8:
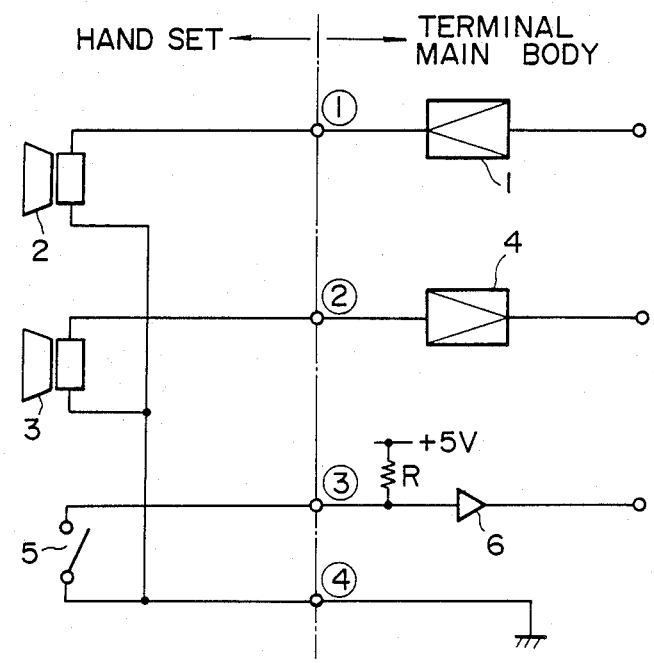
FIG. 8 is a circuit diagram showing another example of the (prior art structure in which a connection between the terminal apparatus main body and the handset is established by four signal lines.

As described above, it is so structured that information of the hook switch 27 is superposingly applied to the signal line of the receiver 26 in a d.c. form and the capacitors 29 and 35 are provided to prevent this d.c. signal from affecting the operation of the receiver 26 and the receiver amplifier 36. As a result, for the output function of the receiver 26 and the detection function of the hook switch 27, only two signal lines are required as compared with four signal lines in the prior art structure. Thus, a connection between the handset assembly 20 and the terminal apparatus main body 22 can be established by four signal lines including the two signal lines of the transmitter. In other words, the handset assembly 20 may be operatively connected to the terminal apparatus main body 22 using the 4-pin modular jack 21. With this structure, the modular jacks provided in the same terminal apparatus main body differ in shape and structure from each other, so that the possibility of establishing an erroneous connection is advantageously prevented from occurring. In addition, the return line of the hook switch 27 and the return line of the transmitter 25 which is not shown may be lead into the terminal apparatus main body 22 separately. Thus, the possibility of transferring noise from one to the other can be eliminated, and, moreover, the balanced communication method may be applied to the transmitter In the above-described embodiment, information regarding the status of the hook switch 27 is superimposingly applied to the signal line at the receiver side; however, it should be noted that such information may also be superimposingly applied to the signal line at the transmitter side. That is, there may be constructed an alternative structure by replacing the receiver with a transmitter and the receiver amplifier with a transmitter amplifier. In the above-described embodiment, the handset assembly 20 and the terminal apparatus main body 22 are operatively connected through the modular jack 21 so that the handset assembly 20 may be detached from the terminal apparatus main body 22. And, when the handset assembly 20 is detached, i.e., the modular jack 21 being pulled out, the detection signal $S_4$ becomes high level, thereby allowing to differentiate from the off-hook status. However, if it is not necessary to take this into consideration, the present invention may be realized in a structure shown in FIG. 4. It is to be noted that the embodiment shown in FIG. 4 is structurally similar in many respects to the embodiment shown in FIG. 1, and, thus, like elements are indicated by like numerals. In the embodiment shown in FIG. 1, use is made of a hook switch 27 which is closed during on-hook and set open during off-hook. Accordingly, in this embodiment, the status of the hook switch 27 is detected to be at low level during on-hook and at high level during off-hook.

It is to be noted that the present invention may be applied to any terminal apparatus, such as personal computer or a word processor, which is capable of carrying out telephone communication using a telephone network and it should not be limited only to a facsimile machine as described above specifically. In accordance with the present invention, signal lines of a transmitter and a receiver are all set to be independent from each other and the status information of the associated hook switch is superimposingly applied in a d.c. format to one of the signal lines, so that a connection between the handset assembly and the terminal apparatus main body can be carried out using a 4-pin modular jack. Thus, an erroneous connection can be prevented and introduction of noise is also prevented.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A terminal apparatus comprising:
   a main body; and
   a handset assembly including a transmitter, a receiver and a hook switch, said handset assembly being detachably connected to said main body through a modular jack having a predetermined number of pins, said handset assembly further including a bypass element for accommodating a bypass d.c. component therethrough and thereby bypassing said receiver;
   a capacitor for preventing a split d.c. component from reaching said receiver, said capacitor being connected in parallel with said bypass element and in series with said receiver;
   said hook switch is connected to one of said pins to which said receiver is also connected;
   said main body includes a d.c. power supply for supplying a d.c. component to said handset assembly through the pin to which said hook switch is connected and a detector means for detecting a status of said hook switch depending on a status change of said d.c. component, and an integrating circuit for integrating an integrated d.c. component and inputting an integrated signal into said detector means.

2. An apparatus according to claim 1, wherein said bypass element comprises a resistor.

3. An apparatus according to claim 1, wherein said modular jack has four pins.

4. An apparatus according to claim 1, wherein:
   said receiver and said transmitter are separately connected to said main body by said modular jack.

5. An apparatus according to claim 4, wherein:
   said modular jack connects to said receiver by means of a first pair of pins, and said modular jack connects to said transmitter by means of a second pair of pins.

6. An apparatus according to claim 1, wherein:
   said bypass element is said hook switch.

* * * * *